United States Patent [19]

Oguma

[11] 4,286,749
[45] Sep. 1, 1981

[54] AUTOMATIC FLUID MIXING VALVES

[75] Inventor: Tomio Oguma, Anjo, Japan

[73] Assignee: Aisin Seiki Kabushiki Kaisha, Kariya, Japan

[21] Appl. No.: 61,414

[22] Filed: Jul. 27, 1979

[30] Foreign Application Priority Data

Jul. 28, 1978 [JP] Japan .................................. 53/93023

[51] Int. Cl.³ ...................... G05D 23/00; G05D 11/00
[52] U.S. Cl. ..................................... 236/12 A; 137/111
[58] Field of Search .............. 236/12 R, 12 A, 12 AB, 236/12 J, 12 F, 12 C, 12 E, 12 T, 12 S; 137/111

[56] References Cited

U.S. PATENT DOCUMENTS

| | | | |
|---|---|---|---|
| 962,111 | 6/1910 | Assmann | 137/111 |
| 2,172,489 | 9/1939 | Young | 236/12 S |
| 2,484,945 | 10/1949 | Hatfield | 236/12 T |
| 2,662,541 | 12/1953 | Noon | 137/111 |
| 2,983,279 | 5/1961 | Biermann | 137/111 |
| 3,476,314 | 11/1969 | Boyd | 236/12 |
| 3,489,347 | 1/1970 | Egli | 236/12 |
| 3,595,474 | 7/1971 | Hampert | 236/12 |

Primary Examiner—William E. Wayner
Assistant Examiner—Harry Tanner
Attorney, Agent, or Firm—Finnegan, Henderson, Farabow, Garrett & Dunner

[57] ABSTRACT

An automatic fluid mixing valve comprises temperature sensing means provided in a body of the valve for automatically mixing high and low temperature fluids to provide a mixed fluid having a predetermined temperature, and pressure control means for controlling the pressure ratio of said low temperature fluid to the high temperature fluid at a predetermined value. The pressure control means serves to maintain a ratio of fluid flow of the low and high temperature fluids at a predetermined value thereby maintaining the temperature of the mixed fluid.

4 Claims, 1 Drawing Figure

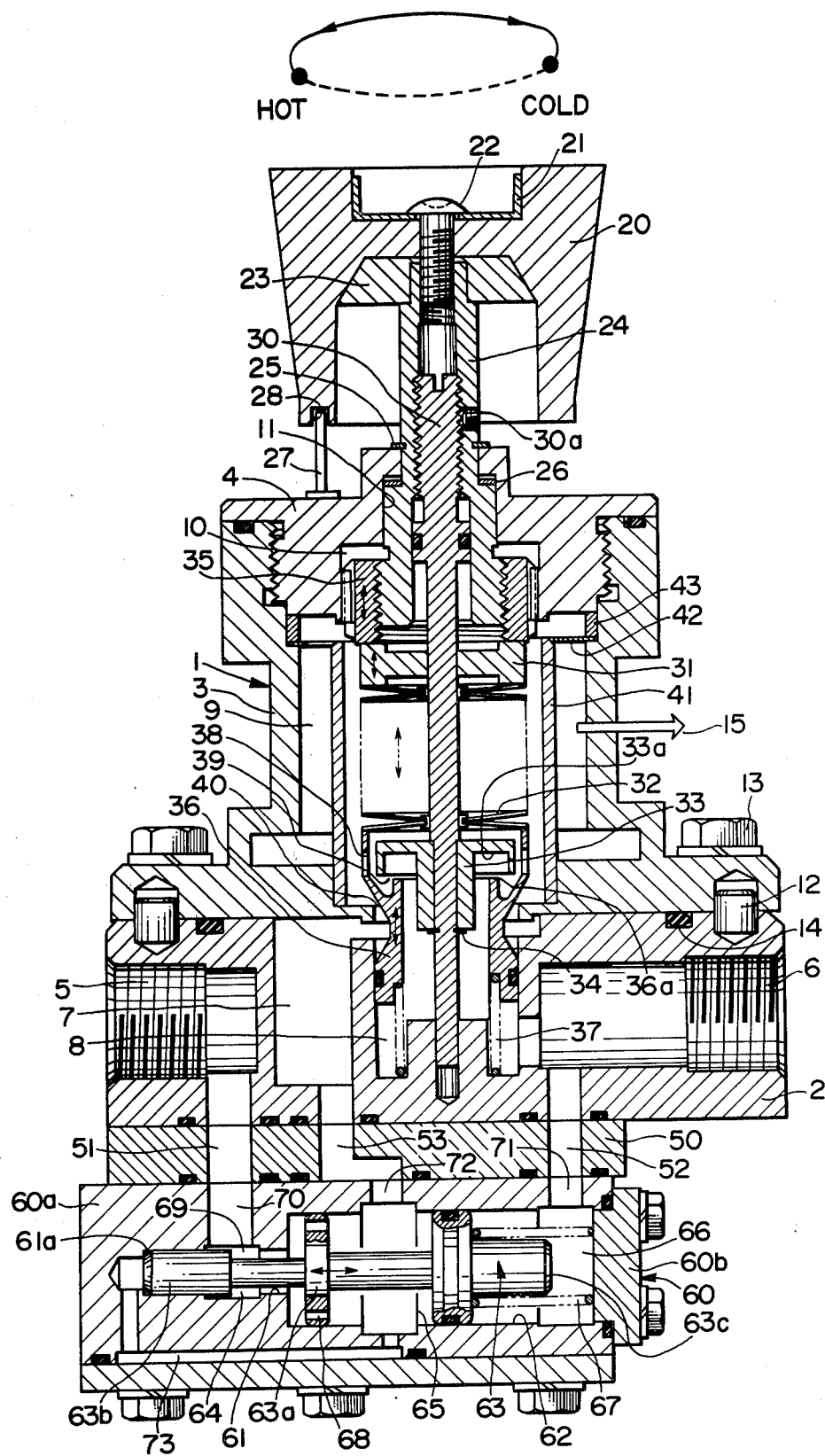

AUTOMATIC FLUID MIXING VALVES

This invention relates to an automatic fluid mixing valve in which the temperature of the mixed fluid is not varied even when the pressure in the inlet of cold or hot water fluid is changed in use.

Hitherto, there has been an automatic fluid mixing valve of such kind in which the valve is operated in response to the thermal expansion of bimetal members or bellows to adjust each opening of the ports through which hot water and cold water flow. Thus in such a valve the rate of flow of the fluid varies in response to changes in the fluid pressure as well as changes in the openings of the ports. Therefore, there are drawbacks that when the ratio of the supply pressure of the cold water and the pressure of the hot water exceeds a predetermined value (normally 2:1 to 5:1), the temperature control becomes impossible so that the temperature of the fluid to be discharged becomes abruptly increased or decreased in use. In order to avoid such danger it is necessary to pre-adjust the ratio of the pressures by manually controlling the openings of the cold and hot water valves. In such a case, however, an abrupt change in the fluid temperature may be caused in practical use, for example, in operation of a shower bath, when another hot water outlet cock is operated.

It is an object of the present invention to provide an automatic fluid mixing valve in an improved and practically usable form to remove the drawbacks described above.

According to the present invention, there is provided an automatic fluid mixing valve comprising a valve body including a chamber therein for mixing high and low temperature fluids, the chamber including first and second gates; first passage means in the body for communicating a source of low temperature fluid through the first gate into the chamber; second passage means for communicating a source of high temperature fluid through the second gate into the chamber; and pressure control means for maintaining the pressure ratio between the low temperature fluid and the high temperature fluid at a predetermined value by controlling only the pressure of the low temperature fluid being communicated to the first passage means.

Further, according to the present invention, there is provided an automatic fluid mixing valve comprising temperature sensing means housed in a chamber provided in a body of the valve for mixing high and low temperature fluids to provide a mixed fluid having a predetermined temperature, first passage means for allowing a low temperature fluid to flow through a first gate into said chamber, second passage means for allowing a high temperature fluid to flow through a second gate into said chamber, said temperature sensing means acting to adjust an opening of each of said gates in response to the temperature of the mixed fluid in said chamber, and pressure control means communicating with the second passage means and for maintaining a pressure ratio of the low temperature fluid to the high temperature fluid at a substantially constant level by automatically adjusting only the pressure value of the low temperature fluid flowing into the chamber in response to a change in the pressure value of the high temperature fluid.

The accompanying drawing is a side-sectional elevation of an preferred embodiment of the automatic fluid mixing valve in accordance with the present invention.

In the drawing, 1 is a body of the valve including a fluid inlet section 2, a fluid mixing section 3 and a cover section 4. The fluid inlet section 2 has an cold water inlet port 5, hot water inlet port 6, a passage 7 and a cavity 8. The fluid mixing section has a fluid mixing chamber 9 which is communicated with an ON/OFF outlet cock (not shown) to discharge the fluid in the chamber 9 through the outlet cock to the exterior as shown by an arrow 15 in the drawing. The cover section 4 also has a larger diameter bore portion 10 and a smaller diameter bore portion 11. The fluid inlet section 2 and the fluid mixing section 3 are aligned by means of pins 12 with each other and fixedly connected by bolts 13 to provide the desired concentricity of an internal mechanism described hereinafter. A seal ring 14 is provided between the sections 1 and 2 to prevent leakage of the fluid therebetween. The fluid mixing section 3 and cover section 4 are in screwthreaded engagement with each other.

20 is a knob, 21 is a washer member, 22 is a securing screw and 23 is a member disposed between the knob 20 and a regulating shaft 24 to prevent relative rotation between these parts. The screw 22 extends through the washer 21, the knob 20 and the member 23 and screwthreadedly engages with the shaft 24, such that the knob 20 is not removed by the screw 20 from the shaft 24 and can be rotated therewith.

The regulating shaft 24 is rotatable relative to the body 1, but not axially movable because of an E-ring 25 and a washer 26. A stop pin 27 is fixed to the cover section 4 and slidably engaged at its free end with an arcuate groove 28 formed on the knob 20. The arrangement is such that when the knob 20 is rotated to engage one remote end of the arcuate groove 28 with the pin 27, only the cold water is discharged from the valve, and when the knob is oppositely rotated to engage the other remote end of the groove 28 with the pin 27, only the hot water is discharged from the valve.

30 is a shaft which is in screw-threaded engagement with the regulating shaft 24 to extend through the fluid mixing chamber 9 of the body 1. The shaft 30 is fixed by a screw 30a after the axial position of the shaft 30 has been adjusted. Provided on the shaft 30 are a spacer member 31, temperature sensing means 32 including a plurality of bimetal members, and a valve member 33 fixed by an E-ring 34 for controlling the rate of flow of the fluid. The spacer member 31 and the temperature sensing means 32 are axially movable relative to the shaft 30.

An adjusting nut 35 is disposed against rotation within the larger diameter bore portion 10 of the cover section 4 and is screw-threadedly engaged with the regulating shaft 24. The nut 35 is axially moved by rotating the shaft 24.

Slidably disposed within the cavity 8 of the fluid inlet section 2 of the body 1 is an axially movable valve member 36 which is upwardly urged under the action of a spring 37 for controlling the rate of flow of the fluid. Thus, the spacer member 31 and the bimetal members 32 are held between the adjusting nut 35 and the movable valve member 36. The member 36 is also formed with exit holes 38. 39 is a first gate defined by the fixed and movable valve members 33 and 36, and 40 is a second gate defined by the fluid mixing section 3 and the movable valve member 36.

The sleeve 41 is fixedly mounted by a suitable number of radially extending plates 42 and a spacer ring 43. The plates 42 are bridged across an inner stepped portion of the fluid mixing section 3 and an upper end of the sleeve 41 so that there are provided spacings between adjacent plates 42 through which the fluid within the interior of the sleeve 41 is directed to the fluid mixing chamber 9.

50 is a connecting member fixed to the fluid inlet section 2 and including passages 51, 52 and 53 in communication with the cold water inlet port 5, the hot water inlet port 6 and the passage 7, respectively.

Numeral 60 is a pressure control valve for maintaining the pressure ratio of cold water to hot water at a predetermined value even when the change in the pressure of hot water and/or cold water occurs. The pressure control valve 60 is fixed to the member 50 and includes a valve body 60a, an end cover 60b, smaller and larger diameter hollow cylinders 61 and 62 formed in the body 60a, a piston 63 slidably disposed within the cylinders 61, 62, and three chambers or cavities 64, 65 and 66 formed therein. 67 is a spring disposed in the chamber 66 for urging the piston 63 against a remote end 61a of the smaller diameter cylinder 61 to open a port 69 described later. The piston is so designed that the diameter of its land 63b is smaller than that of its intermediate land 63a which, in turn, is equal in diameter to its land 63c having a circumferential O-ring groove. The pressure in the chamber 65 acts on the piston against the action of the spring 67. Numeral 68 refers to restricted through-holes formed in the land 63a of the piston 63 for communicating between the chambers 64 and 65. 69 is a cold fluid inlet port opening between the lands 63a and 63b of the piston 63. 70, 71 and 72 are passages for communicating between the passages 51, 52 and 53 of the connecting member 50 and the chambers 64, 65 and 66 of the pressure sensing valve 60, respectively. 73 is a by-pass passage for communicating between the chamber 64 and the end surface of the land 63b.

With the arrangement, in order to discharge only the cold water, the knob 20 and the regulating shaft 24 are rotated rightwardly, and thus the nut 35, the spacer 31, the temperature sensing means 32 and the movable valve member 36 are upwardly moved under the action of the spring 37 until an inner top end 36a of the member 36 abuts against a flange portion 33a of the fixed valve member 33. The axial movement of the sensing means 32 and the spacer 31 are arrested. However, since the knob 20 and the shaft 24 are further rotated in the same direction until a remote end of the groove 28 abuts against the stop pin 27, the lower end of the nut 35 is slightly separated from the upper end of the spacer 31. Accordingly, the cold water fed to the inlet port 5 is directed through the passages 51, 70 the port 69, the chamber 64, and the through-holes 68 to the chamber 65. In addition, a certain amount of the water is by-passed through the passage 73 to act on the end surface of the land 63b of the piston against the action of the spring 67, thereby regulating the opening of the port 69 in response to the pressure of the supply line. The remaining substantial amount of the water is supplied from the chamber 65 to the outlet cock through the passages 72, 53, 7, the second gate 40 and the fluid mixing chamber 9. At this time, the temperature sensing means 32 within the chamber 9 is cooled and further bent to lengthen its overall stroke thereby downwardly moving the movable valve member 36 against the action of the spring 37. Thus throttles the rate of flow of the water, but the design is made not to cause any trouble.

In order to mix the hot water fluid into the cold water fluid, the knob 20 and thus the regulating shaft 24 are leftwardly rotated to a suitable position. The port 69 will be enlarged when the piston 63 is moved leftward due to the increase in the pressure of hot water or the decrease in the pressure of cold water. Thus, a large amount of cold water flows into the first passage means so that a ratio of the fluid flow of cold water to hot water may be maintained at a constant level. Further, the opening of port 69 will be reduced when the piston 63 is moved rightward due to the decrease in the pressure of hot water or the increase in the pressure of cold water. Thus, the fluid flow through port 69 is controlled depending upon the extent of the opening of the port 69 so that the pressure ratio of cold water to hot water may be maintained at the predetermined value. Therefore, the amount of the fluid flow of cold water through second gate 40 is varied in accordance with the change in the flow rate of hot water through the first gate 39, thereby maintaining the temperature of the mixed fluid in the chamber 9 at the predetermined value. Thus, the adjusting nut 35 is downwardly moved to downwardly urge the spacer member 31, the temperature sensing means 32 and the movable valve member 36 against the action of the spring 37 thereby opening the first and second gates 39 and 40. In this case, the cold water is supplied to the second gate 40 as described above. The hot water fluid is supplied from the inlet port 6 through the passages 52, 71 to the chamber 66 to affect a lower pressure to the piston 63. (In this case, the ratio of the pressures of the cold and hot water fluids is pre-set at 2:1). The hot water fluid is also supplied from the inlet port 6 through the cavity 8, the first gate 39 and the exit holes 38 into the fluid mixing chamber 9 where the fluids are completely mixed with each other, and are passed to the outlet cock.

If the temperature of the mixed fluid is the pre-set temperature, the temperature sensing means 32 in the fluid mixing chamber 9 remains unchanged. If the temperature of the mixed fluid is higher than the pre-set temperature, the temperature sensing means 32 are each flattened to shorten the overall stroke, such that the movable valve member 36 is upwardly moved under the action of the spring 37 to decrease the opening of the first gate 39. This decreases the rate of flow of the hot water and increases the opening of the second gate 40 thereby increasing the rate of flow of the cold water to automatically lower the temperature of the mixed fluid to the pre-set value. If the temperature of the mixed fluid is lower than the pre-set temperature, the temperature sensing means 32 are each bent to lengthen the overall stroke, such that the movable valve member 36 is downwardly moved against the action of the spring 37 to increase the opening of the first gate 39. This increases the rate of flow of the hot water and decreases the opening of the second gate 40 thereby decreasing the rate of flow of the cold water to automatically raise the temperature of the mixed fluid to the pre-set value.

In order to expel only the hot water fluid, the knob 20 and thus the regulating shaft 24 are leftwardly rotated until the opposite remote end of the groove 28 abuts against the pin 27. In so doing, the adjusting nut 35 is downwardly slid so that the spacer member 31, the temperature sensing means 32 and the axially movable valve member 36 are downwardly moved against the action of the spring 37 to open the first gate 39 and close the second gate 40. Accordingly, the hot water fed to the inlet port 6 is directed through the passages 52 and 71 to the chamber 66 to move the piston 63 in the left direction in cooperation with the spring 67. The hot water is also directed to the fluid mixing chamber 9 and hence to the outlet cock. In this case, the temperature sensing means 32 are each forced to be flattened to shorten the stroke so that the stroke is not varied by the high temperature of the hot water.

When the pressure of hot water is increased or decreased, the piston 63 is moved leftward or rightward so as to enlarge or reduce the opening of the port 69. This increases or decreases the pressure of cold water in the chamber 65. Accordingly, the flow rate of the cold water through the second gate 40 is varied in accordance with the variation in the flow rate of hot water through the first gate 39. As a result, the temperature of the mixed fluid in the chamber 9 is kept at the predetermined level. Further, when the pressure of cold water is changed, the piston 63 is moved rightward or leftward so as to reduce or enlarge the opening of the port 69. This decreases or increases the amount of cold water in the chamber 65. Thus, the flow rate of the cold water through the second gate 40 is varied in accordance with the change in the flow rate of the hot water through the first gate 39 and the temperature of the mixed fluid in the chamber 9 is maintained at a predetermined value. It is noted that the pressure of the hot water may not be varied by the pressure variation in the cold water.

With the present invention described above, the following effects are brought forth by combining the fluid mixing valve and the pressure control valve.

(1) Even when the pressure of the cold water or the hot water fluid supply varies in use, the pressure ratio of both fluids is maintained at a predetermined value. The invention varies the amount of the fluid flow of the cold water in accordance with a variation in the flow rate of the hot water or the cold water, thus maintaining the temperature of the mixed water fluid at the predetermined value.

(2) In use, when the pressure of the cold water fluid varies, the pressure is automatically adjusted to maintain the mixed water fluid at the predetermined value.

Although there is described one embodiment of the invention shown in the accompanying drawing wherein the pressure control valve is connected to the body, it will be evident that the present invention is not limited to such an embodiment and the pressure control valve may, for example, be provided within the body.

What is claimed is:

1. An automatic fluid mixing valve comprising: a valve body including a chamber therein for mixing high and low temperature fluids, said chamber including first and second gates; temperature sensing means housed in said chamber and responsive to the temperature of the mixed fluid in said chamber for adjusting the openings of said first and second gates; first passage means in said body for communicating a source of low temperature fluid through said first gate into said chamber; second passage means for communicating a source of high temperature fluid through said second gate into said chamber; and pressure control means for automatically adjusting only the pressure of the low temperature fluid flowing into said chamber in response to a change in the pressure of one of the high temperature and low temperature fluids flowing into said chamber, said pressure control means communicating with said second passage means for maintaining the pressure ratio of the low temperature fluid to the high temperature fluid at a substantially constant level, said body including a valve bore having a port at one end thereof, and said pressure control means including piston means slidably mounted in said bore and having opposed ends, said piston means defining a first cavity in fluid communication with said source of low temperature fluid through said port, a second cavity in fluid communication with said first passage means and said first cavity, and a third cavity for receiving high temperature fluid from said source of high temperature fluid, said pressure control means also including a spring disposed in said bore for biasing said piston means in one direction for enlarging the opening of said port, and a bypass passage for communicating between said second cavity and one end of said piston means for urging said piston means in the other direction against the bias of said spring.

2. An automatic fluid mixing valve according to claim 1, wherein said piston means includes at least one orifice disposed between said first and second cavities.

3. An automatic fluid mixing valve comprising a valve body including a chamber therein for mixing high and low temperature fluids, said chamber including first and second gates; first passage means in said body for communicating a source of low temperature fluid under pressure through said first gate into said first chamber; second passage means for communicating a source of high temperature fluid under pressure through said second gate into said chamber; manual means for adjusting the opening of each of said gates; and pressure control means for adjusting only the pressure of said low temperature fluid in response to a change in the pressure of one of said high and low temperature fluids, said pressure control means for maintaining the pressure ratio of said low temperature fluid to said high temperature fluid substantially at a predetermined value, said body including a valve bore having a port at one end thereof, and said pressure control means including piston means slidably mounted in said bore and having opposed ends, said piston means defining a first cavity in fluid communication with said source of low temperature fluid through said port, a second cavity in fluid communication with said first passage means and said first cavity, and a third cavity for receiving high temperature fluid from said source of high temperature fluid, said pressure control means also including a spring disposed in said bore for biasing said piston means in one direction for enlarging the opening of said port, and a bypass passage for communicating between said second cavity and one end of said piston means for urging said piston means in the other direction against the bias of said spring.

4. An automatic fluid mixing valve according to claim 3 wherein said piston means includes at least one orifice disposed between said first cavity and said second cavity.

* * * * *